(12) United States Patent
Lipowezky et al.

(10) Patent No.: US 8,599,280 B2
(45) Date of Patent: Dec. 3, 2013

(54) MULTIPLE ILLUMINATIONS AUTOMATIC WHITE BALANCE DIGITAL CAMERAS

(75) Inventors: Uri Lipowezky, Kiryat Ono (IL); Ilya Vol, Rosh-HaAyin (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 337 days.

(21) Appl. No.: 12/948,149

(22) Filed: Nov. 17, 2010

(65) Prior Publication Data

US 2011/0122284 A1    May 26, 2011

Related U.S. Application Data

(60) Provisional application No. 61/272,945, filed on Nov. 23, 2009.

(51) Int. Cl.
*H04N 9/73* (2006.01)

(52) U.S. Cl.
USPC ........................................ 348/223.1

(58) Field of Classification Search
USPC ............... 348/222.1, 223.1, 224.1, 225.1; 345/590; 382/167
See application file for complete search history.

(56) References Cited

U.S. PATENT DOCUMENTS

| | | | | |
|---|---|---|---|---|
| 5,319,449 A * | 6/1994 | Saito et al. | ................ | 348/223.1 |
| 5,565,913 A | 10/1996 | Matsui et al. | | |
| 5,568,194 A * | 10/1996 | Abe | ........................... | 348/223.1 |
| 5,659,357 A * | 8/1997 | Miyano | ...................... | 348/223.1 |
| 5,808,681 A * | 9/1998 | Kitajima | ........................ | 348/371 |
| 6,747,694 B1 * | 6/2004 | Nishikawa et al. | ........ | 348/229.1 |
| 7,006,135 B2 * | 2/2006 | Ishimaru et al. | ........... | 348/223.1 |
| 7,148,922 B2 * | 12/2006 | Shimada | .................... | 348/224.1 |
| 2002/0080245 A1 * | 6/2002 | Parulski et al. | ............... | 348/223 |
| 2002/0080246 A1 * | 6/2002 | Parulski | ........................ | 348/225 |
| 2002/0113881 A1 * | 8/2002 | Funston et al. | ............... | 348/223 |
| 2003/0025822 A1 * | 2/2003 | Shimada | ....................... | 348/370 |
| 2003/0058350 A1 * | 3/2003 | Ishimaru et al. | ........... | 348/223.1 |
| 2009/0033762 A1 * | 2/2009 | Abe | ........................... | 348/223.1 |

FOREIGN PATENT DOCUMENTS

| | | |
|---|---|---|
| JP | 07-123435 | 5/1995 |
| JP | 2205-167560 | 6/2005 |
| KR | 102007003599 | 4/2007 |

* cited by examiner

*Primary Examiner* — Nicholas Giles
(74) *Attorney, Agent, or Firm* — Harness, Dickey & Pierce, P.L.C.

(57) ABSTRACT

A multiple source automatic white balancing method includes performing a first image processing on a subject image and generating a first processed image; performing a second image processing on the subject image and generating a second processed image; and generating a third processed image by blending the first and second processed images together based on an output of an outdoor weight map function.

12 Claims, 16 Drawing Sheets

Gray zone gamut: 1 – indoor gray zone, 2 – outdoor gray zone, 3 – low brightness circle gray zone, and 4 – low temperature gray zone Receiver operation characteristic (ROC): error vs. F. Outdoor (red) and indoor (blue)

MULTIPLE ILLUMINATIONS AUTOMATIC WHITE BALANCE DIGITAL CAMERAS

CROSS REFERENCES TO RELATED APPLICATIONS

This non-provisional patent application claims priority under 35U.S.C. §119(e) to U.S. Provisional Application Ser. No. 61/272,945, filed Nov. 23, 2009 the entire contents of which is incorporated herein by reference.

BACKGROUND

1. Field

Example embodiments relate to multiple illumination white balance and control mechanisms for image signal processing in digital cameras.

2. Description of Related Art

The color associated with an object in digital cameras is not constant and depends on illuminant color, viewing conditions, and miscellaneous sensor parameters. A typical case of a multiple sources illuminated image is provided in FIG. 1. FIG. 1 illustrates a scene in which part of the scene is illuminated using an indoor illuminant and another part is illuminated using an outdoor illuminant such as open window. In this instance, a conventional single white balance system may yield a reddish cast in the indoor illuminated part and a bluish cast in the outdoor part of the image.

Typically digital stills cameras use single white balancing techniques. These in its turn, restricts the field of cameras application. When using a multiple white balance, the quality of photos captured under complex illumination conditions is seen.

Conventional indoor-outdoor detectors are based on topological, geometrical, and hierarchical texture features. These detectors often involve cluster-based image segmentation technologies, which may consume a great deal of time and memory for small mobile phone cameras. However these techniques make a huge impact on image quality as is reflected in typical consumer digital stills cameras.

SUMMARY

Example embodiments provide methods and devices for implementing multiple illumination auto white balancing. A multiple source automatic white balancing method may include performing a first image processing on a subject image and generating a first processed image; performing a second image processing on the subject image and generating a second processed image; and generating a third processed image by blending the first and second processed images together based on an output of an outdoor weight map function.

According to example embodiments, the first image processing may be performed using parameters associated with indoor lighting, and the second image processing is performed using parameters associated with outdoor lighting.

According to example embodiments, the method may further include generating the third processed image may include determining the output of the outdoor weight map function for each of a plurality of sections of the subject image, and forming each of a plurality of a sections of the third image by blending a corresponding section of the first processed image with a corresponding section of the second image based on the output of outdoor weight map function associated with a corresponding section of the subject image.

According to example embodiments, the method may further include constructing a classifier by training the classifier based on image statistics determined for each of the plurality of training images.

According to example embodiments, the determined image statistics may include whether each training image is an indoor image or an outdoor image, a normalized balance of each training image, a first illumination point of each training image, and a second illumination point of each training image.

According to example embodiments, the determined image statistics may further include, for each of the plurality of training images, a first gray point of the training image, a second gray point of the training image, a gamut height of the training image, and a gamut width of the training image.

According to example embodiments, the method may further include determining an output of the classifier for each of the plurality of sections of the subject image, wherein, for each section of the subject image, the output of the outdoor weight map function for the section is determined based on the corresponding output of the classifier for the section.

BRIEF DESCRIPTION OF DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Figure 1A:
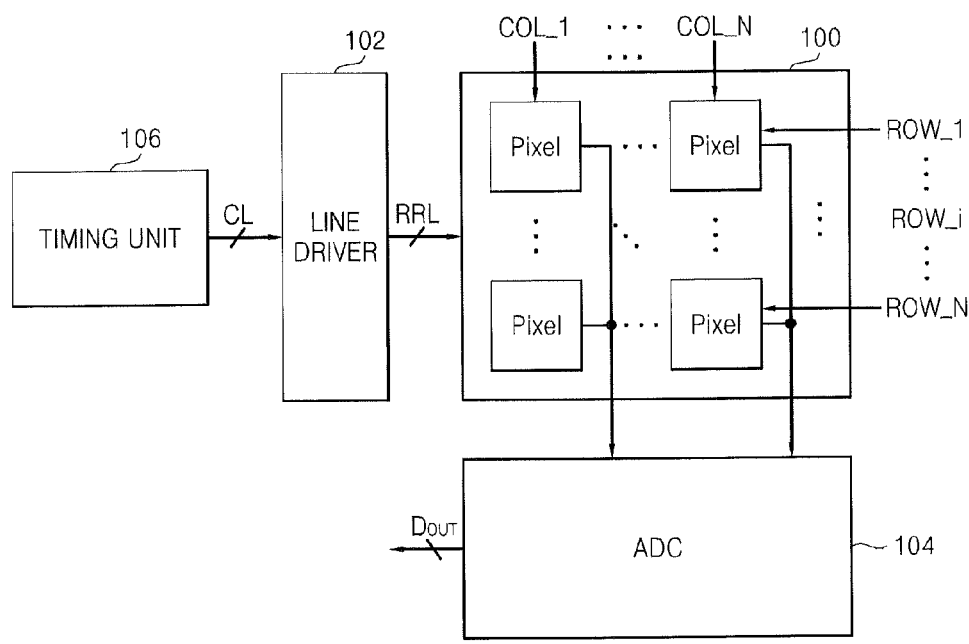
FIG. 1A illustrates an image sensor according to example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1A illustrates a conventional architecture for a complementary-metal-oxide-semiconductor (CMOS) image sensor.

Referring to FIG. 1A, a timing unit or circuit 106 controls a line driver 102 through one or more control lines CL. In one example, the timing unit 106 causes the line driver 102 to generate a plurality of read and reset pulses. The line driver 102 outputs the plurality of read and reset pulses to a pixel array 100 on a plurality of read and reset lines RRL.

The pixel array 100 includes a plurality of pixels P arranged in an array of rows ROW_1-ROW_N and columns COL_1-COL_N. Each of the plurality of read and reset lines RRL corresponds to a row of pixels P in the pixel array 100. In FIG. 1A, each pixel P may be an active-pixel sensor (APS), and the pixel array 100 may be an APS array. Pixels P are each capable of receiving light and generating an electrical signal based on the received light.

In more detail with reference to example operation of the image sensor in FIG. 1, read and reset pulses for an ith row ROW_i (where $i=\{1, \ldots, N\}$). of the pixel array 100 are output from the line driver 102 to the pixel array 100 via an ith of the read and reset lines RRL. In one example, the line driver 102 applies a reset signal to the ith row ROW_i of the pixel array 100 to begin an exposure period. After a given, desired or predetermined exposure time, the line driver 102 applies a read signal to the same ith row ROW_i of the pixel array to end the exposure period. The application of the read signal also initiates reading out of pixel information (e.g., exposure data) from the pixels P in the ith row ROW_i.

Figure 9:
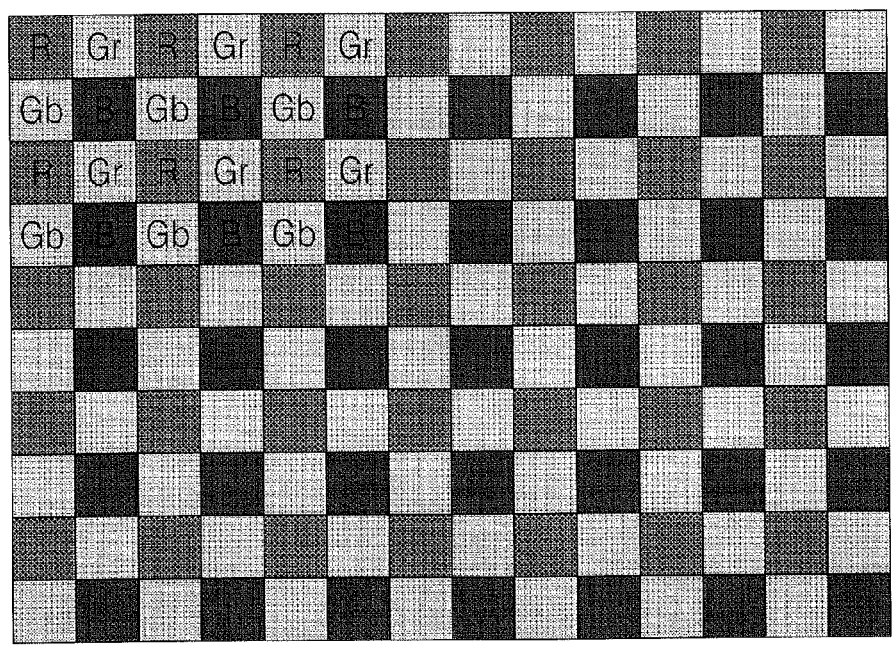
FIG. 9 illustrates an example of the CFA used in the imaging array 110.

The pixel array 110 may also include a color filter array (CFA) following a Bayer pattern. FIG. 9 illustrates an example of the CFA used in the imaging array 110. As indicated in FIG. 9, the CFA may use a 2×2 cell pattern including a red cell R, a blue cell B, and two green cells, Gr and Gb.

The analog to digital converter (ADC) 104 converts the output voltages from the ith row of readout pixels into a digital signal, Dour. The ADC 104 may perform this conversion either serially or in parallel. For example, an ADC 104 having a column parallel-architecture converts the output voltages into a digital signal in parallel.

Figure 1B:
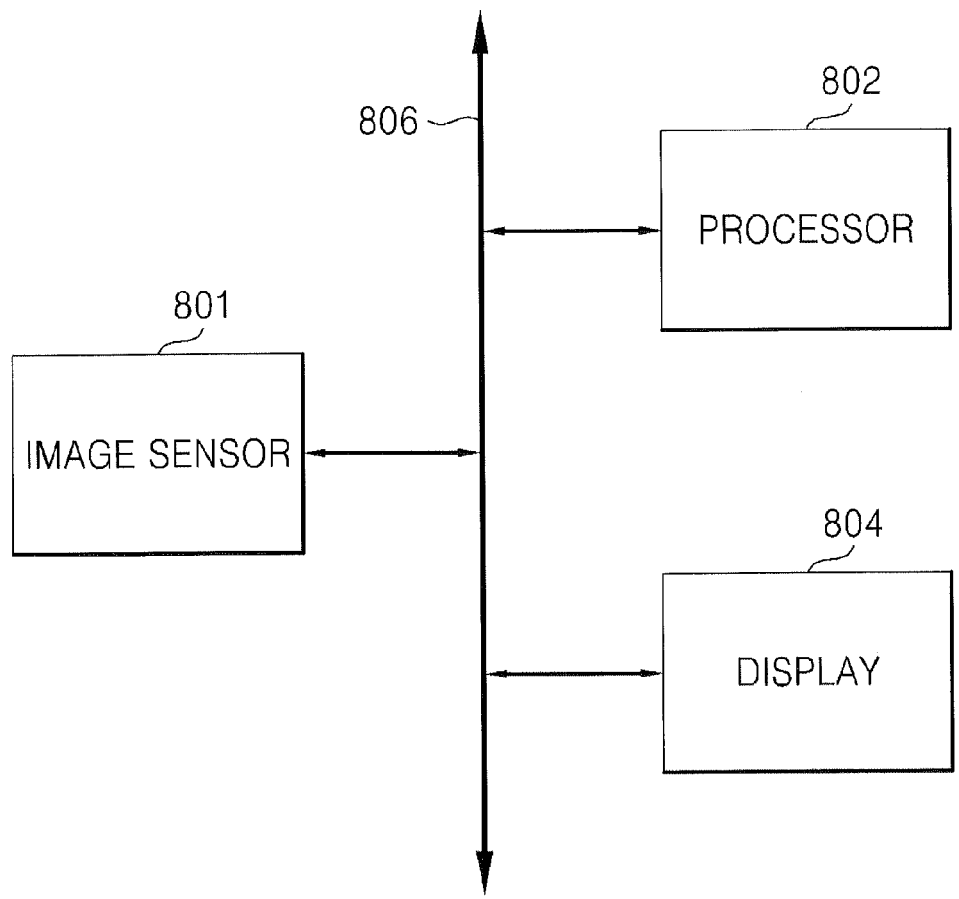
FIG. 1B illustrates an imaging system according to example embodiments.

FIG. 1B is a block diagram illustrating an electronic imaging system 800 according to example embodiments.

Referring to FIG. 1B, the electronic imaging system 800 may include, for example, a processor 802, an image sensor 801, and a display 804 which may communicate with each other via a bus 806. The processor 802 is configured to execute a program and control the electronic system. The image sensor 801 is configured to capture image data by converting optical images into electrical signals. The image sensor 801 may be an image sensor as described above with regard to FIG. 1A. The processor 802 also processes the captured image data for storage in a memory (not shown) and/or display by the display 804. The electronic system may be connected to an external device (e.g., a personal computer or a network) through an input/output device (not shown) and may exchange data with the external device.

For example, the electronic system shown in FIG. 1B may embody various electronic control systems including an image sensor (e.g., a digital camera), and may be used in, for example, mobile phones, personal digital assistants (PDAs), laptop computers, netbooks, MP3 players, navigation devices, household appliances, or any other device utilizing an image sensor or similar device.

The processor 802 is capable or receiving, from the image sensor 801, digital image data. The image processor is capable of performing image processing operations on the digital image data and outputting a processed image. The image processor 802 will be discussed in greater detail below.

Figure 2:
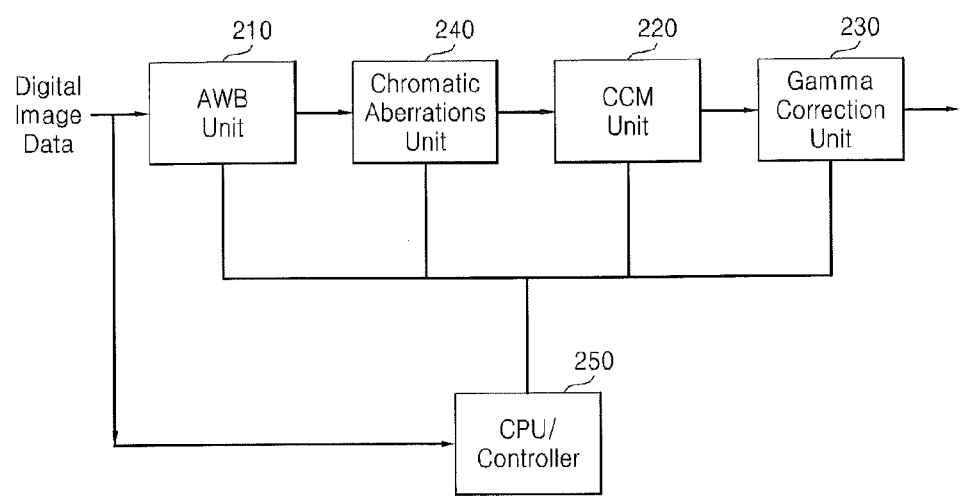
FIG. 2 illustrates an example of an image processor included in the imaging system of FIG. 1 according to example embodiments.

FIG. 2 illustrates an example of the image processor 802 included in the imaging system 800 in greater detail. The image processor 802 may include, for example, an auto white balancing (AWB) unit 210 for applying white balancing functions to the captured image, a color correction matrix (CCM) unit 220 for applying color correction matrix functions to the digital image data, a gamma correction unit 230 for applying gamma correction functions the digital image data, a chromatic aberrations unit 240 to reduce or eliminate chromatic aberration in the digital image data. The image processor 130 may also include a CPU/controller 250 for controlling the operations of the AWB unit 210, CCM unit 220, gamma correction unit 230 and chromatic aberrations unit 240.

The CPU/controller 250 may implement an indoor outdoor detection function for the image data. The CPU/controller 250 may receive the digital image data from the image sensor 801 and may generate a determination regarding whether the image data represents an image taken outside or indoors. The CPU/controller 250 may also generate a patch outdoor weight value, $W_b$ (x,y) as a representation of the degree to which image data is considered outdoor image data for each of a plurality of sub-images, or image patches, having center coordinates (x,y), included in an image. The CPU/controller 250 may control the operation of one or more of the AWB unit 210, CCM unit 220, gamma correction unit 230 and chromatic aberrations unit 240 based on the patch outdoor weight values, $W_b$ (x,y). Further, The CPU/controller 250 may store the patch outdoor weight values $W_b$ (x,y) corresponding to each of a plurality of patches of an image in the form of an outdoor weight map (OWM). The CPU/controller 250 may use the OWM to process images of scenes having multiple illumination types (e.g., indoor and outdoor). The process of generating the OWM and using the OWM to process images of scenes having multiple illumination types will be discussed in greater detail below.

Outdoor weight values $W_b$ (x,y) used for forming the OWM maybe calculated with the use of the indoor and outdoor detectors. Below, methods for constructing indoor outdoor detectors will be discussed with reference to FIGS. 3-10 and methods for performing indoor-outdoor detection will be discussed with reference to FIG. 11. Next methods for generating the outdoor weight values, $W_b$(x,y), generating the OWM, and performing image processing based on the OWM will be discussed with reference to FIGS. 12-15.

Constructing Indoor-Outdoor Detectors

According to example embodiments, indoor-outdoor detection may be performed on video streamed images in order to determine whether the streamed images are outdoor or indoor images. According to example embodiments, indoor-outdoor detection may be performed with the use of two different indoor-outdoor detectors (IODs), a high-brightness IOD and a low-brightness IOD. The IODs may be implemented by, for example, the CPU/controller 250 illustrated in FIG. 2. The IODs may be constructed, for example, in an offline process.

The detector used to perform the indoor outdoor detection may be selected based on a brightness level of a subject image. For example, a high brightness IOD may be used to perform indoor-outdoor detection for images having a high brightness level and a low brightness IOD may be used to perform indoor outdoor diction for images having a low brightness level.

Methods for constructing a high-brightness IOD will now be discussed with reference to FIGS. 3-7.

Figure 3:
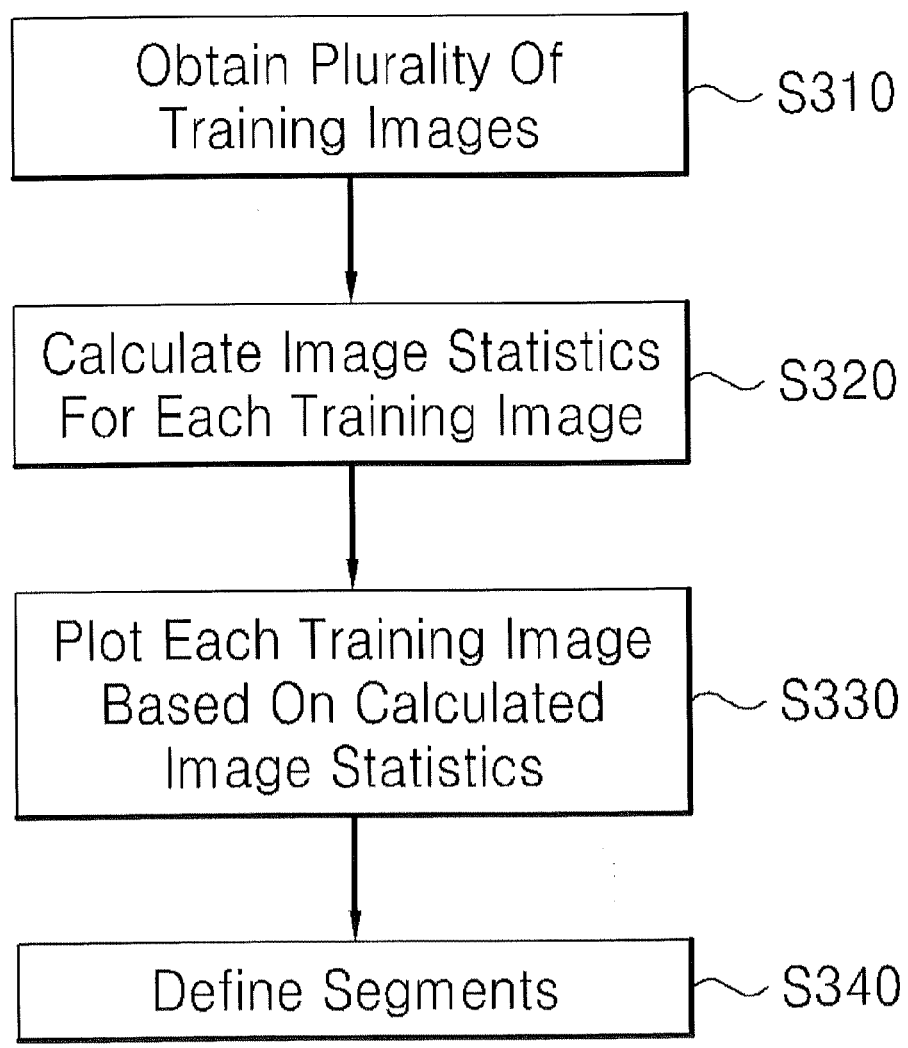
FIG. 3 illustrates a method of constructing a high-brightness indoor-outdoor detector (IOD).

FIG. 3 illustrates a method of constructing a high-brightness IOD. In step S310, a plurality of training images is obtained. For each of the training images, it is known whether the training image is an outdoor image or an indoor image.

Figure 4:
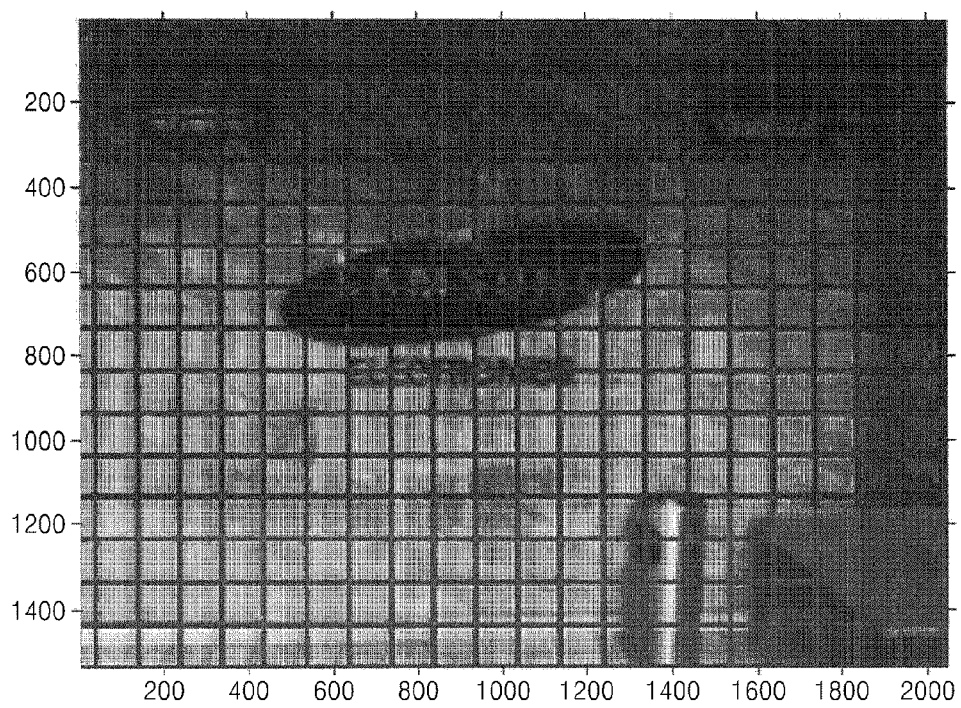
FIG. 4 illustrates an example of an image which has been divided into patches using a regular grid.
Figure 5:
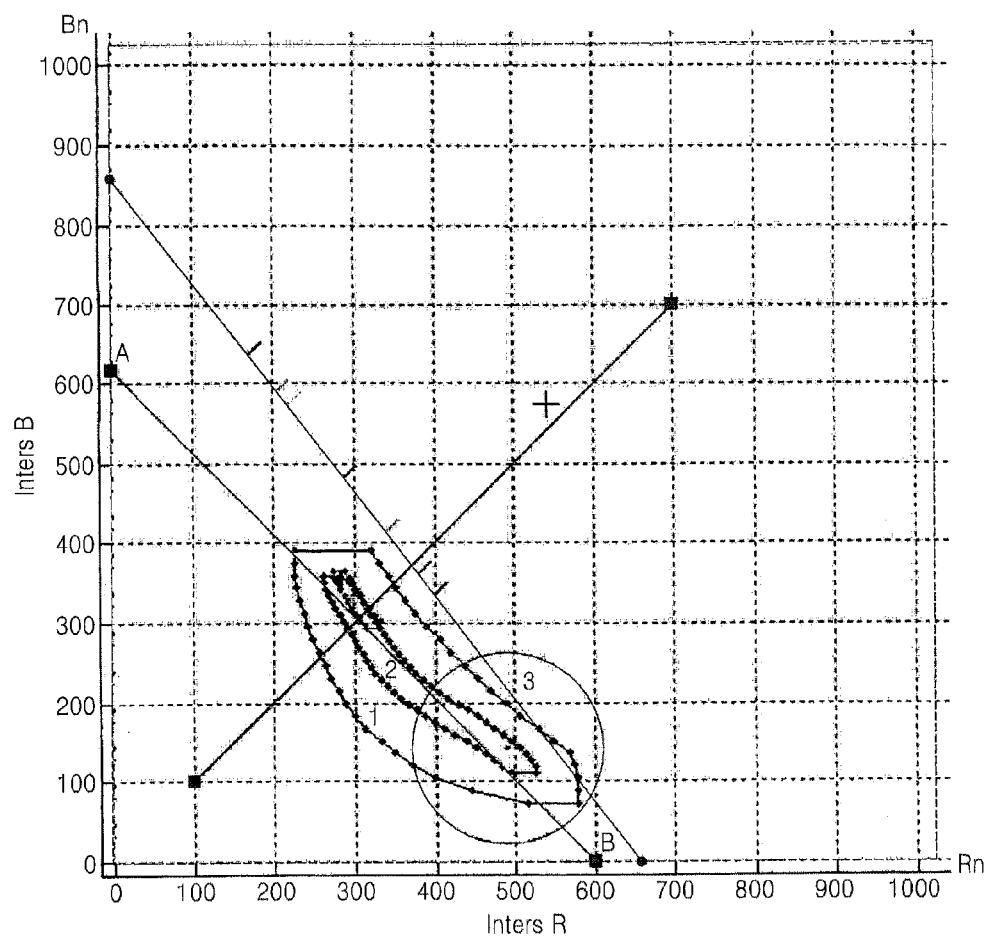
FIG. 5 illustrates a gray zone gamut in a normalized (Rn, Bn) color space.
Figure 6:
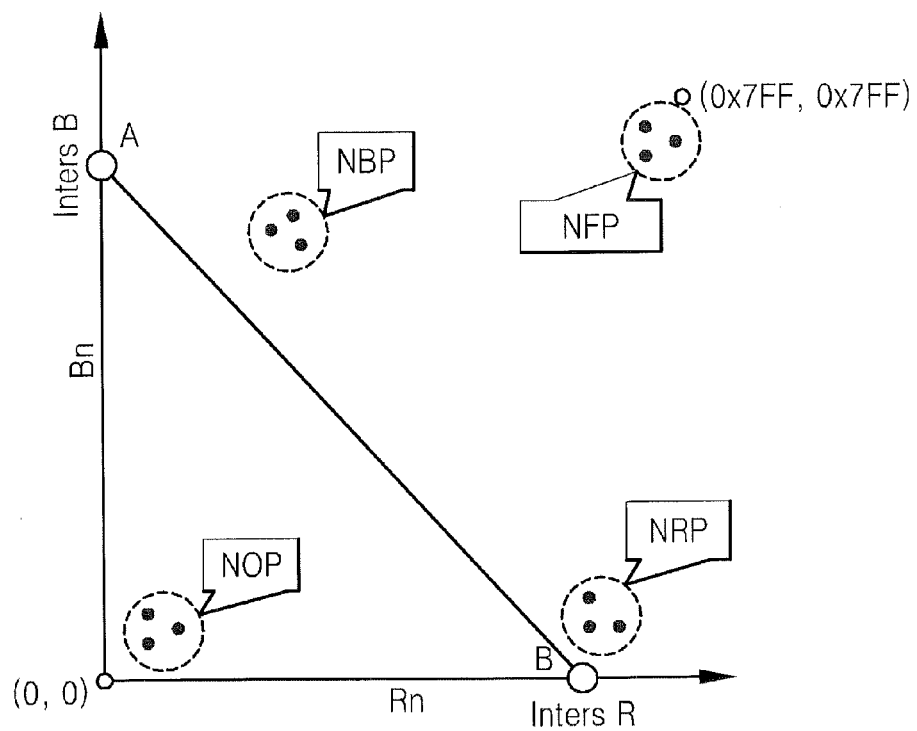
FIG. 6 is another illustration of the normalized (Rn,Bn) color space illustrated in FIG. 5.

In step S320, image statistics are calculated for each of the training images obtained in step S310. In particular a normalized brightness value Nbr and a chromacity difference value ΔRB are calculated. Step S320 will be explained in greater detail with reference to FIGS. 4-6. FIG. 4 illustrates an example of an image which has been divided into patches using a regular grid. FIG. 5 illustrates a gray zone gamut in a normalized (Rn,Bn) color space. FIG. 6 is another illustration of a normalized (Rn,Bn) color space illustrated in FIG. 5. In step 320, a normalized brightness, Nbr is calculated for each training image using equation (1).

$$Nbr = \frac{\sum_{i,j}(R+G+B)}{WHEG} \quad (1)$$

The value i,j is the image coordinate; R,G,B is the image value at coordinate i,j; W is the image width; H is the image height; E is the capture exposure; and G is the analog gain for this capture.

Next, an illumination point (IP) is calculated for each training image with respect to a normalized (Rn,Bn) color space. In the normalized (Rn,Bn) color space, normalized red chromacity values Rn and normalized blue chromacity values Bn may be defined by equations (2) and (3), respectively.

$$Rn = 2048\frac{R}{R+G+B} \quad (2)$$

$$Bn = 2048\frac{B}{R+G+B} \quad (3)$$

In order to calculate the illumination point, the original image is divided into patches using a regular grid as illustrated in FIG. 4. Next, for each patch (i,j), normalized red chromacity average values Rn(i,j) may be calculated according to equation (4), and normalized blue chromacity average values Bn(I,j) may be calculated according to equation (5), where summation $$\sum_{i,j} X$$

denotes summation over channel X inside patch (i,j).

$$Rn(i,j) = 2048\frac{\sum_{i,j} R}{\sum_{i,j} R + \sum_{i,j} G + \sum_{i,j} B} \quad (4)$$

$$Bn(i,j) = 2048\frac{\sum_{i,j} B}{\sum_{i,j} R + \sum_{i,j} G + \sum_{i,j} B} \quad (5)$$

These patch average values Rn(i,j), Bn(i,j), are filtered using the indoor gray zone, zone 1, displayed in FIG. 4. The indoor gray zone 1 illustrated in FIG. 4 is device dependent and tuned once per sensor modification. The patch average values passed through the filter are denoted as gray points (GPs). An average over GPs is used to obtain an illumination point IP=(IP$_r$,IP$_b$) according to equations (6) and (7) below where #G denotes the number of GPs (i.e., patches passed gray zones).

$$IP_r = \frac{\sum_{i,j \in G} Rn(i,j)}{\#G} \quad (6)$$

$$IP_b = \frac{\sum_{i,j \in G} Bn(i,j)}{\#G} \quad (7)$$

Using the illumination point, the final illumination point (FIP) is calculated as (FIP$_r$, FIP$_b$) according to equations (8) and (9).

$$FIP_r = \frac{192 IP_r + 64 MGP}{256} \quad (8)$$

$$FIP_b = \frac{192 IP_b + 64 MGP}{256} \quad (9)$$

The middle gamut point (MGP) is evaluated as follows. Two auxiliary points, which are denoted as near R-point (NRP) and near B-point (NBP) are calculated over the total amount of all GPs. Point NRP is the GP point the closest to point IntersR shown in FIG. 5 and point NBP is the GP point closest to point IntersB shown in FIG. 5. Points IntersR and IntersB illustrated in FIG. 5 are the points where a white locus line 410 intersects the normalized blue chromacity (Bn) axis and the normalized red chromacity (Rn) axis, respectively. Accordingly, the MGP may be defined by equation (10) below.

$$MGP = \frac{NRP + NBP}{2} \quad (10)$$

FIG. 6 is another illustration of the normalized (Rn,Bn) color space. As illustrated in FIG. 6, the point NRP may also be an average of, for example, the three GPs nearest point A. Further, the point NBP may also be an average of, for example, the three GPs nearest a point B. FIG. 6 also illustrates a near-0 points, NOP, and Near-F points, NFP representing gray points nearest the lower-left most and upper-right most points in the normalized (Rn,Bn) color space.

Returning to step S320 in FIG. 3, once the FIP (FIP$_r$, FIP$_b$) is calculated, a chromacity difference value, $\Delta$RB, representing a difference between red and blue chromatic values for the image can be calculated according to equation (11) below.

$$\Delta RB = FIP_r - FIP_b \quad (11)$$

Figure 7:
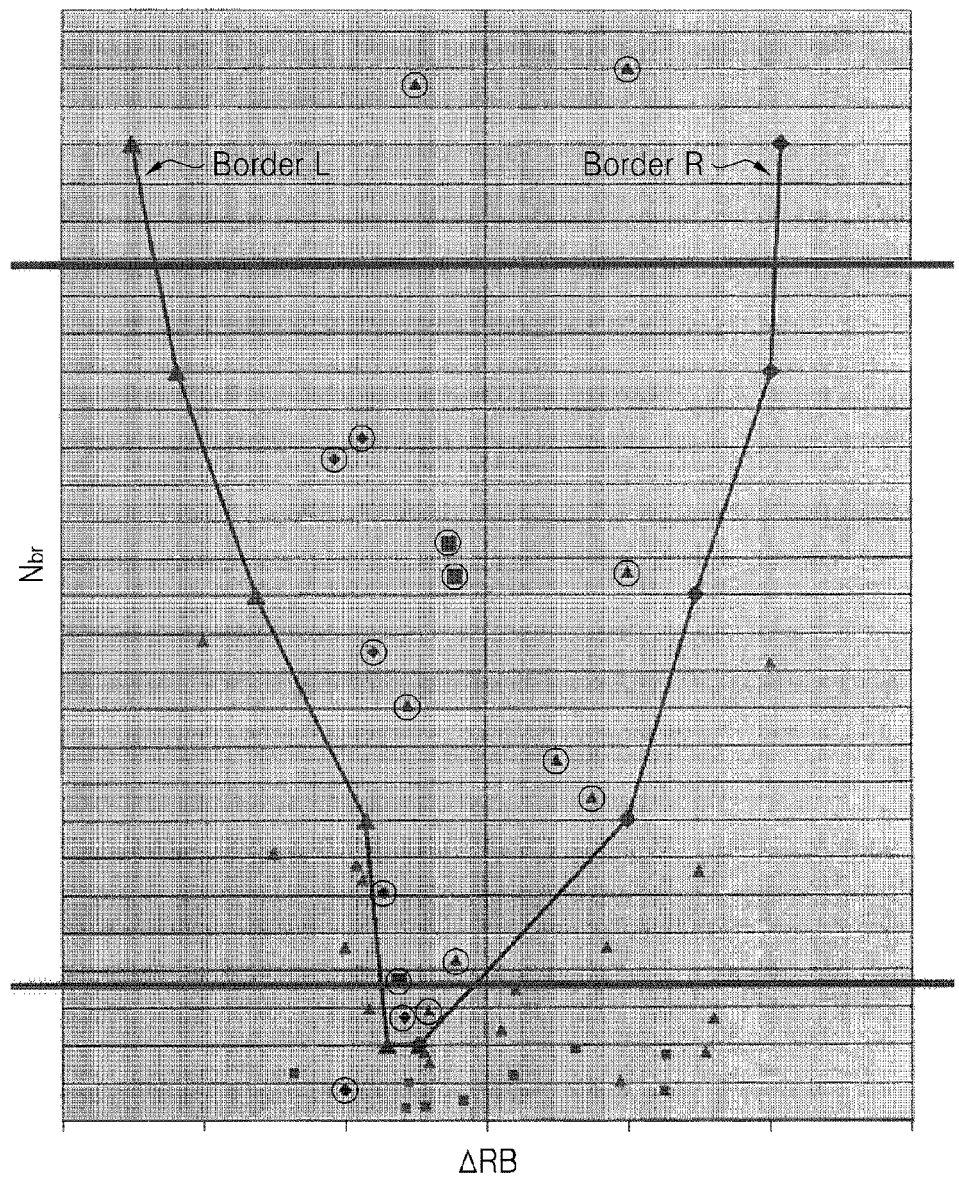
FIG. 7. illustrates an example of a scatter plot formed based on the normalized brightness values Nbr and the chromacity difference values ΔRB of a plurality of training images.

Next, in step S330, each training image is plotted on a graph based on the normalized brightness value Nbr and the chromacity difference value $\Delta$RB calculated in step S320. Step S330 will be discussed with reference to FIG. 7. FIG. 7 illustrates a scatter plot 700 which is an example of a scatter plot formed based on the normalized brightness values Nbr and the chromacity difference values $\Delta$RB for a plurality of training images. Referring to FIG. 7, the circled points represent training images which are known to be outdoor images. The points that are not circled represent training images which are known to be indoor images. FIG. 7 also illustrates an upper brightness threshold, $T_{max}$, and a lower brightness threshold, $T_0$ which will be discussed in greater detail below.

Next, in step S340 left and right segments are defined in the scatter plot generated in step S340. Referring again to FIG. 7, in step S340 a left segment, BorderL, and a right segment, BorderR are defined. Segments BorderL and BorderR are tunable and are selected with respect to the specific sensor data. With reference to scatter plot 700, it is desirable to select segments BorderL and BorderR so that plots representing outdoors image data will be inside segments BorderL and BorderR and plots representing indoor image data will outside the segments. The misclassification rate is selected according to a user's preferences.

Once the left and right segments, BorderL and BorderR, are defined, the scatter plot 700 can be used as a high-brightness IOD. Methods for using scatter plot 700 as a high-brightness IOD will be discussed in greater detail below with reference to FIG. 11.

Figure 8:
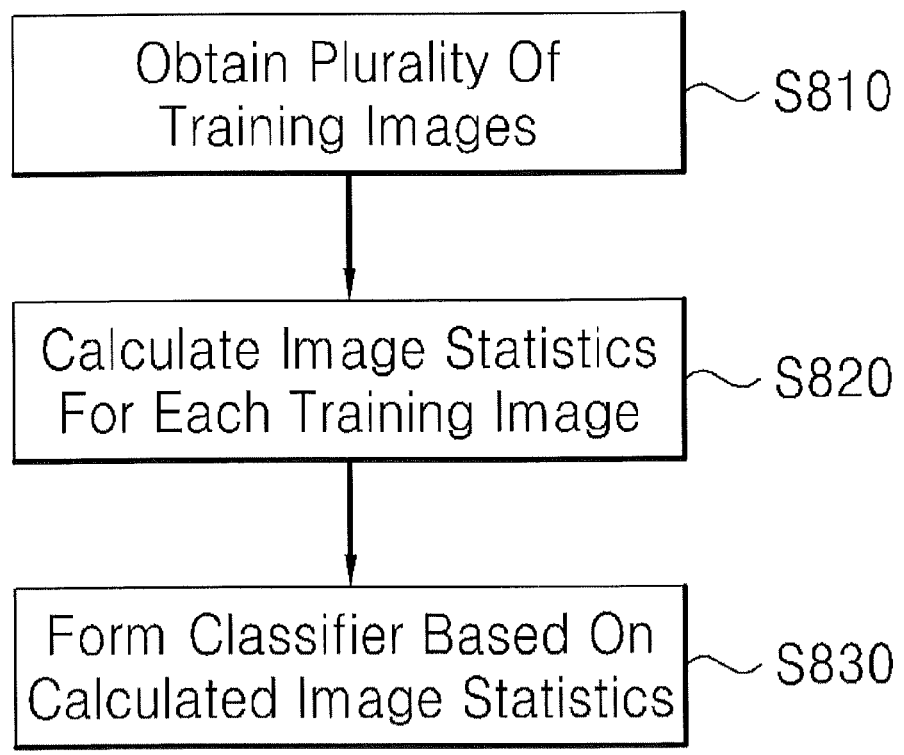
FIG. 8 illustrates a method of constructing a low-brightness IOD.
Figure 10:
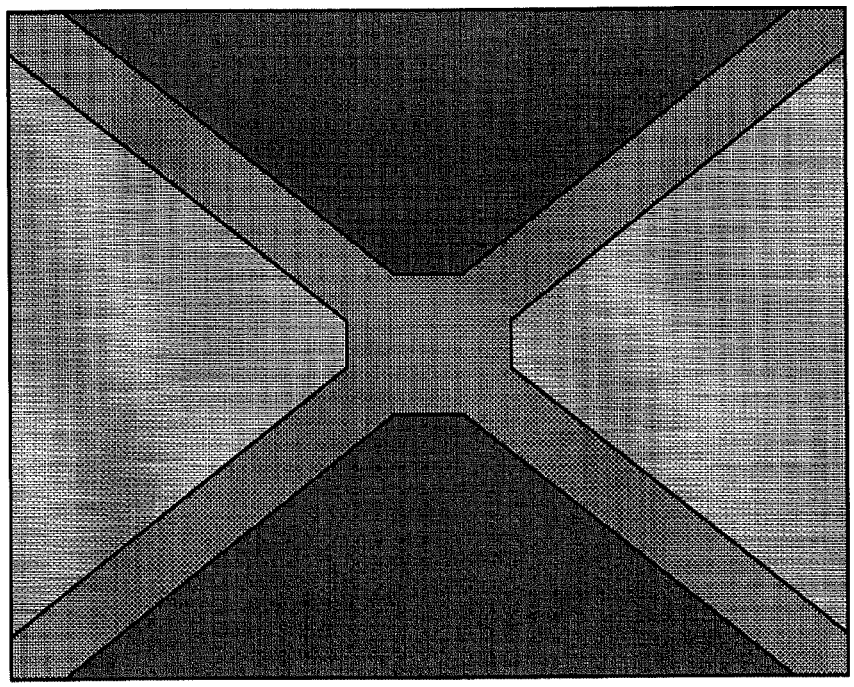
FIG. 10 illustrates disparity zone locations over a frame of captured image.

Methods for constructing a low-brightness IOD will now be discussed with reference to FIGS. 8-10. FIG. 8 illustrates a method of constructing a low-brightness IOD. According to example embodiments, the low-brightness IOD may be a gentle boost classifier. The gentle boost classifier will be discussed in greater detail below. In step S810, a plurality of training images is obtained. For each of the training images, it is known whether the training image is an outdoor image or an indoor image.

In step S820 image statistics are calculated for each of the training images obtained in step S810 in order to form the features which will be used to train the gentle boost classifier. Below, 17 example features are described.

Feature 1 may be a normalized brightness Nbr of the training image calculated using equation (1).

Features 2 and 3 may be the coordinates Rn and Bn, respectively, of the nearest-R point NRP of the training image, as discussed above with reference to step S320 in FIG. 3.

Features 4 and 5 may be the coordinates Rn and Bn, respectively, of the nearest-B point NBP of the training image, as discussed above with reference to step S320 in FIG. 3.

Features 6 and 7 may be the coordinates Rn and Bn of the middle gamut point MGP of the training image calculated using equation (10).

Feature 7 may be a gamut width, GamWid of the training image. The gamut width GamWid may be calculated by determining the distance between the nearest-R point, NRP, and the nearest-B point, NBP discussed above with reference to step S320 in FIG. 3.

Feature 8 may be a gamut height, GamHei of the training image. The gamut height GamHei may be calculated by determining the distance between the nearest-Far point, (NFP), and the nearest-O point, (NOP) discussed above with reference to step S320 in FIG. 3.

Feature 9 may be a chromacity difference value $\Delta$RB of the training image calculated using equation (11).

Feature 10 may be a read blue disparity calculated using equation (13) below.

$$D_{rb} = 1024 \frac{\sum_{GP} Rn - \sum_{GP} Bn}{\sum_{GP} Rn + \sum_{GP} Bn} \quad (12)$$

Feature 11 may be a Green the G-illumination point calculated using equation (13) below.

$$FIP_g = 2048 - FIP_r - FIP_b \quad (13)$$

Features 12-16 are associated with a green disparity value, $D_p$. As discussed above with reference to FIGS. 1 and 2, according to example embodiments, images captured by the imaging system 100 are captured using a the imaging array 110 which includes a CFA. The CFA included in the imaging array 110 uses a 2×2 Bayer patter containing red, blue and two green cells, which are denoted as Gr and Gb as illustrated in FIG. 9.

Since light penetration into silicon depends on light wavelength the difference between Gr and Gb values is an additional feature called green disparity. With respect to the incident angle, green disparity is mapped into five zones, as displayed in FIG. 10. FIG. 10 illustrates disparity zone locations over a frame of captured image. Referring to FIG. 10, the five zones include a cross zone located in the middle of the frame, a top zone, a right zone, a bottom zone and a left zone.

For each zone, green disparity $D_p$ is calculated using equation (14) below where p∈{cross, top, bottom, left, right} and summation provided for all patches inside the zone.

$$D_p = 1024 \frac{\sum_p (G_r - G_b)}{\sum_p (R - B)} \quad (14)$$

Features 12-16 may be the green disparity according to the cross zone, top zone, right zone, bottom zone and a left zone, respectively.

The process for determining which zone a given patch of a captured image belongs in will now be discussed. The green disparity zones illustrated in FIG. 10 are calculated using a signed patch distance from the major image diagonal $D_{ma}$, and the minor image diagonal $D_{mi}$ according to equations (15) and (16), respectively below.

$$D_{ma}(x, y) = \frac{(yW - xH)}{\sqrt{W^2 + H^2}} \quad (15)$$

$$D_{mi}(x, y) = \frac{yW + xH - WH}{\sqrt{W^2 + H^2}} \quad (16)$$

Referring to equations (15) and (16), the coordinates (x, y) may denote the central coordinate of the patch, W is the image width, and H is the image height. If $\min(|D_{mi}|,|D_{ma}|) \leq 0.05 \min(W, H)$, it is assumed that the patch belongs to the cross zone. If the patch satisfies the predicate (0.4W≤x≤0.6W) & (0.4H≤y≤0.6H), it is assumed that the patch belongs to the cross zone. If the patch does not belong to a cross zone, the zone to which the patch belongs may be calculated according to equation (17) below in accordance with the {Bottom, Left, Right, Top} order.

$$N_z = (1 - \text{sign}(D_{ma})) + \frac{(1 - \text{sign}(D_{mi}))}{2} \quad (17)$$

Feature 17 may an average green disparity calculated according to equation (18) below.

$$Da = \frac{\sum_{p=1}^{5} |D_p|}{5} \quad (18)$$

Returning to FIG. 8, in step S830, the gentle boost classifier is built based on the features collected for each training image in step S820. The features collected in step S820 may be stored in, for example, an annotated image database. In step S830, the features collected in step S820 are used to train the gentle boosting classifier. The gentle boosting classifier may be expressed according to equation (19) below.

$$F = \sum_{i=1}^{N} a_i(\varphi_i > t_i) + b_i = B + \sum_{i=1}^{N} a_i(\varphi_i > t_i) \quad (19)$$

Referring to equation (17), N may represent the number of rounds, $\phi_i$ may represent the value of the feature, when using round i, $t_i$ may represent a threshold, and $a_i$ may represent the round weight. According to example embodiments, the process of constructing the low-brightness IOD in the form of a gentle boosting classifier as described in FIG. 8 may be performed offline. The parameters ($\phi_i$, $a_i$, $t_i$), i=1 . . . N may be adjusted offline during the classifier construction stage according to know methods.

Once the classifier is trained using the features collected for each of the training images in step S820, the classifier can be used as a low-brightness IOD. Methods for using the classifier as a low-brightness IOD will be discussed in greater detail below with reference to FIG. 11.

Performing Indoor Outdoor Detection

Figure 11:
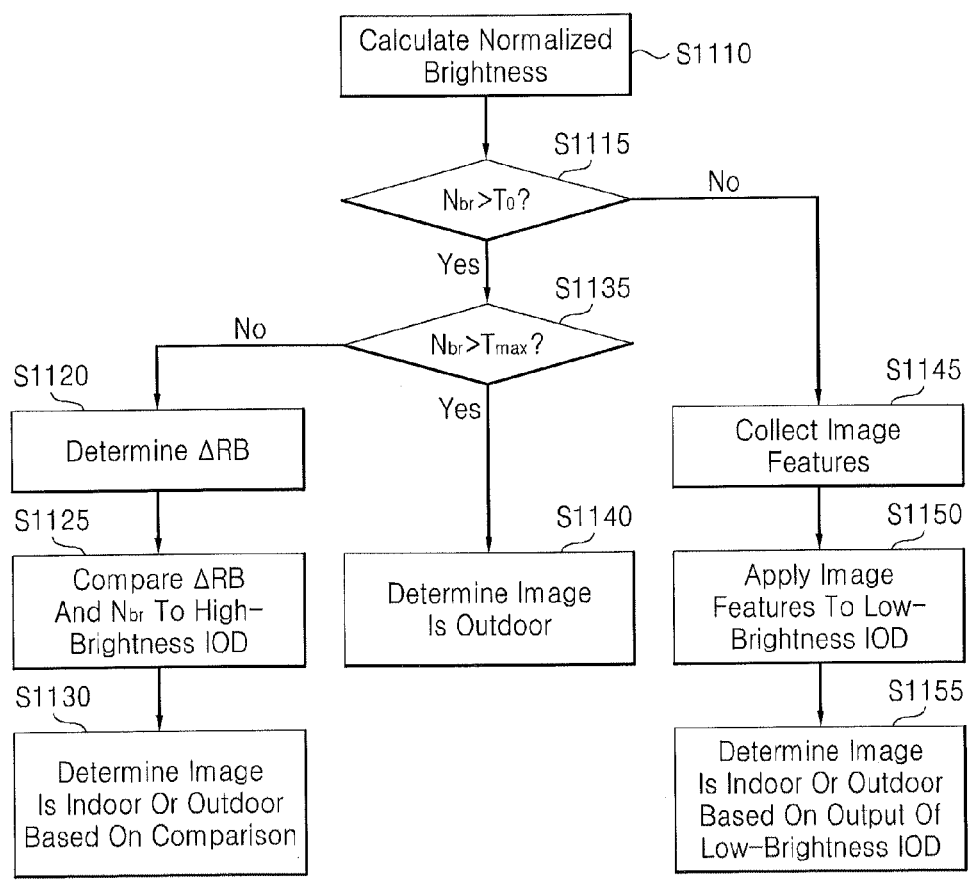
FIG. 11 illustrates a method of using the high-brightness and low-brightness IODs according to example embodiments in order to detect whether a subject image is an indoor image or an outdoor image.

FIG. 11 illustrates an example method for using the high-brightness and low-brightness IODs according to example embodiments in order to detect whether a subject image is an indoor image or an outdoor image. The method illustrated in FIG. 11 may be executed by, for example, the CPU/controller 250 illustrated in FIG. 1.

Referring to FIG. 11, in step S1105, the subject image is captured using, for example, S1110, a normalized brightness Nbr of the subject image may be calculated using equation (1). According to example embodiments, the normalized brightness Nbr of the subject image may be used to determine whether the subject image is a low-brightness image or a high-brightness image.

In step S1115, the normalized brightness Nbr of the subject image determined in step S1110 may be compared to a brightness threshold value, $T_0$. The threshold value $T_0$ represents a lower threshold for a normalized brightness Nbr value of the subject image. The threshold value $T_0$ may be tuned according to a user's specification. If the normalized brightness Nbr of the subject image is greater than $T_0$, method proceeds to step S1135.

In step S1135, the normalized brightness Nbr of the subject image is compared to a second brightness threshold value $T_{max}$. The threshold $T_{max}$ represents an upper threshold for a normalized brightness Nbr value of the subject image. The threshold value $T_{max}$ may be tuned according to a user's specification. If the normalized brightness Nbr of the subject image is not greater than $T_{max}$, the subject may be determined to be a low-brightness image and the method proceeds to step S1120.

In step S1120, a chromaticity difference value ΔRB may be determined using equation (11) in the manner discussed above with reference to FIG. 3.

In step S1125, the chromaticity difference value ΔRB calculated in step S1120 and the normalized brightness Nbr calculated in step S1110 may be compared to the high-brightness IOD 700 illustrated in FIG. 7. The normalized brightness Nbr and chromaticity difference value ΔRB may be compared with the left and right segments of the high-brightness IOD 700.

In step S1130, the subject image is determined to be an indoor image or an outdoor image based on the comparison in step S1125. For example. if the normalized brightness Nbr and chromacity difference value ΔRB of the subject image fall in between the left and right segments of the high-brightness IOD 700, BorderL and BorderR, the subject image may be determined to be an outdoor image. If the normalized brightness Nbr and chromacity difference value ΔRB of the subject image fall outside the left and right segments of the high-brightness IOD 700, BorderL and BorderR, the subject image may be determined to be an indoor image.

Returning to step S1135, if in step S1135 If the normalized brightness Nbr of the subject image is greater that the brightness threshold $T_{max}$, the method proceeds to step S1140.

In step S1140, the subject image is determined to be an outdoor image based n the normalized brightness Nbr of the subject image exceeding the upper threshold $T_{max}$.

Returning to step S1115, if in step S1115, the normalized brightness Nbr of the subject image is not greater than the lower threshold $T_0$, the subject image is determined to be a low-brightness image and the method proceeds to step S1145.

In step S1145, image features are collected for the subject image. The image features collected in step S1145 may include, for example, all of the 17 features described above with reference to FIG. 8, or any subset thereof.

In step S1150, the features collected in step S1145 are applied to low-brightness IOD represented by the classifier function (19) according to known methods.

In step S1155, the subject image may be determined to be an indoor image or an outdoor image based on the output of the classifier, F. For example, if F is positive value, the subject image may be determined to be an outdoor scene, and if F is negative, the subject image may be determined to be an indoor scene.

According to example embodiments, the normalized brightness values Nbr of a subject image may be used to determine whether to use the high-brightness IOD 700 or the low-brightness IOD represented by equation (19). Accordingly, by choosing a detection method based on the normalized brightness Nbr of the subject image, indoor-outdoor detection may be performed with a higher degree of accuracy.

Next, calculating the outdoor weight map based on the outdoor weight values for each patch of an image will be discussed.

Calculating the Outdoor Weight Values $W_b(x,y)$

According to example embodiments, the OWM of a subject image consists of a plurality of outdoor weight values $W_b(x,y)$ corresponding to each of a plurality of patches within a subject image. The coordinates (x,y) represent the center coordinates of each patch. The outdoor weight values $W_b(x,y)$ a patch of the subject image may be calculated, for example, one of three different ways depending on a normalized brightness level of the patch centered at (x,y), Nbr(x,y), the lower and upper brightness thresholds $T_0$ and $T_{max}$, and an outdoor weight transition ramp $\Delta_N$. The process of calculating patch outdoor weight values $W_b(x,y)$ will now be discussed n greater detail below.

If Nbr(x,y)≥$T_0$+$\Delta_N$, a high-brightness outdoor weight $W_b^{High}(x,y)$ is used; if Nbr(x,y)≤$T_0$−$\Delta_N$, a low-brightness outdoor weight $W_b^{Low}(x,y)$ is used; and if $T_0$−$\Delta_N$<Nbr(x,y)<$T_0$+$\Delta_N$, a combination of the low-brightness outdoor weight $W_b^{Low}(x,y)$ and the high-brightness outdoor weight $W_b^{High}(x,y)$ are used.

Accordingly, the final outdoor weight for a patch centered at (x,y), $W_b(x,y)$, may be expressed according to equation (20) below.

$$W_b(x, y) = \begin{cases} W_b^{Low}(x, y), & \text{if } Nbr(x, y) \leq T_0 - \Delta_N \\ \frac{(Nbr(x, y) - T_0 + \Delta_N)W_b^{Highly}(x, y) - (Nbr(x, y) - T_0 + \Delta_N)W_b^{Low}(x, y)}{2\Delta_N}, & \text{if } T_0 - \Delta_N < Nbr(x, y) < T_0 + \Delta_N \\ W_b^{Highly}(x, y), & \text{if } Nbr(x, y) \geq T_0 + \Delta_N \end{cases} \quad (20)$$

The high-brightness outdoor weight $W_b^{High}(x,y)$ may be calculated based on two other outdoor weights $W_b^N(x,y)$ and $W_b^S(x,y)$ according to equation (21) below.

$$W_b^{High}(x,y) = \min(W_b^N(x,y), W_b^S(x,y)) \quad (21)$$

The outdoor weight $W_b^N(x,y)$ is a normalized brightness-based outdoor weight function which may be calculated with the use of a normalized brightness ramp $\delta_N$. The normalized brightness ramp $\delta_N$ is defined as a transition zone between high-brightness and low-brightness indoor-outdoor detectors. The value of the normalized brightness ramp $\delta_N$ is defined using scatter plot 700 of the sensor data after Segments BorderL and BorderR are adjusted. For example, $\delta_N$ may be defined as the width of a normalized brightness pass around $T_0$ preventing high-brightness indoor-outdoor detector from being unstable for stochastic deviations of the normalized brightness around value $T_0$. The outdoor weight $W_b^N(x,y)$ may be calculated according to equation (22) below.

$$W_b^N(x, y) = \begin{cases} 0, & \text{if } Nbr(x, y) \leq T_0 - \delta_N \\ 128 + 128\frac{(Nbr(x, y) - T_0)}{\delta_N}, & \text{if } T_0 - \delta < Nbr(x, y) < T_0 + \delta_N \\ 256, & \text{if } Nbr(x, y) \geq T_0 + \delta_N \end{cases} \quad (22)$$

The outdoor weight $W_b^S(x,y)$ is a segment based outdoor weight that is based on the segments used in the high-brightness IOD 700 which may be calculated based on an outdoor weight corresponding to the left segment $W_b^L(x,y)$, and an outdoor weight corresponding to the right segment $W_b^R(x,y)$, with the use of a segment ramp $\delta_S$. The segment ramp $\delta_S$ is selected to avoid oscillations of the indoor-outdoor detector around the BorderL and BorderR borders. The value of segment ramp $\delta_S$ is selected using the scatter plot 700 of the sensor data according to a user's preferences. The segment ramp $\delta_S$ is defined as chromaticity difference values ΔRB preventing the high-brightness indoor-outdoor detector from being unstable for stochastic deviations in the vicinity of the BorderL and BorderR segments. The outdoor weight $W_b^S(x,y)$ may be calculated according to equation (23) below.

$$W_b^S(x,y) = \min(W_b^L(x,y), W_b^R(x,y)) \quad (23)$$

The outdoor weight for the left segment $W_b^L(x,y)$ may be calculated according to equation (24) below.

$$W_b^L(x, y) = \begin{cases} 0, & \text{if } \Delta RB(x, y) \leq \Delta RB_0 - \delta_S \\ 128 + 128\frac{(\Delta RB(x, y) - \Delta RB_0)}{\delta_S}, & \text{if } \Delta RB_0 - \delta_S < \Delta RB(x, y) < \Delta RB_0 + \delta_S \\ 256, & \text{if } \Delta RB(x, y) \geq \Delta RB_0 + \delta_S \end{cases} \quad (24)$$

The chromacity difference value $\Delta RB_0$ is defined by equation (25) below.

$$\Delta RB_0 = \frac{\Delta RB^U(Nbr - Nbr^D) - \Delta RB^D(Nbr - Nbr^U)}{Nbr^U - Nbr^D} \quad (25)$$

Referring to equation (26), $\Delta RB^D$ and $\Delta RB^U$ may be chromacity difference $\Delta RB$ values correspondent to horizontal normalized brightness borders $Nbr^D$ and $Nbr^U$. Horizontal normalized brightness borders $Nbr^D$ and $Nbr^U$ are vertical segment limits for the segments BorderL and BorderR and Nbr may represent a normalized brightness for the entire subject image. Horizontal normalized brightness borders $Nbr^D$ and $Nbr^U$ are tuned along with BorderL and BorderR.

The outdoor weight for the right segment $W_b^R(x,y)$ may be calculated according to equation (27) below.

$$W_b^R(x, y) = \begin{cases} 0, & \text{if } \Delta RB(x, y) \geq \Delta RB_0 - \delta_S \\ 128 - 128\frac{(\Delta RB(x, y) - \Delta RB_0)}{\delta_S}, & \text{if } \Delta RB_0 - \delta < \\ & \Delta RB(x, y) < \Delta RB_0 + \delta_S \\ 256, & \text{if } \Delta RB(x, y) \leq \Delta RB_0 + \delta_S \end{cases} \quad (27)$$

The low brightness outdoor weight $W_b^{Low}(x,y)$ may be calculated according to equation (28) below.

$$W_b^{Low}(x, y) = \begin{cases} 0, & \text{if } F(x, y) \leq F_0 - \Delta_F \\ 256\frac{(F(x, y) - F_0)}{2\Delta_F}, & \text{if } F_0 - \Delta_F < F(x, y) < \\ & F_0 + \Delta_F \\ 256, & \text{if } F(x, y) \geq F_0 + \Delta_F \end{cases} \quad (28)$$

Figure 12:
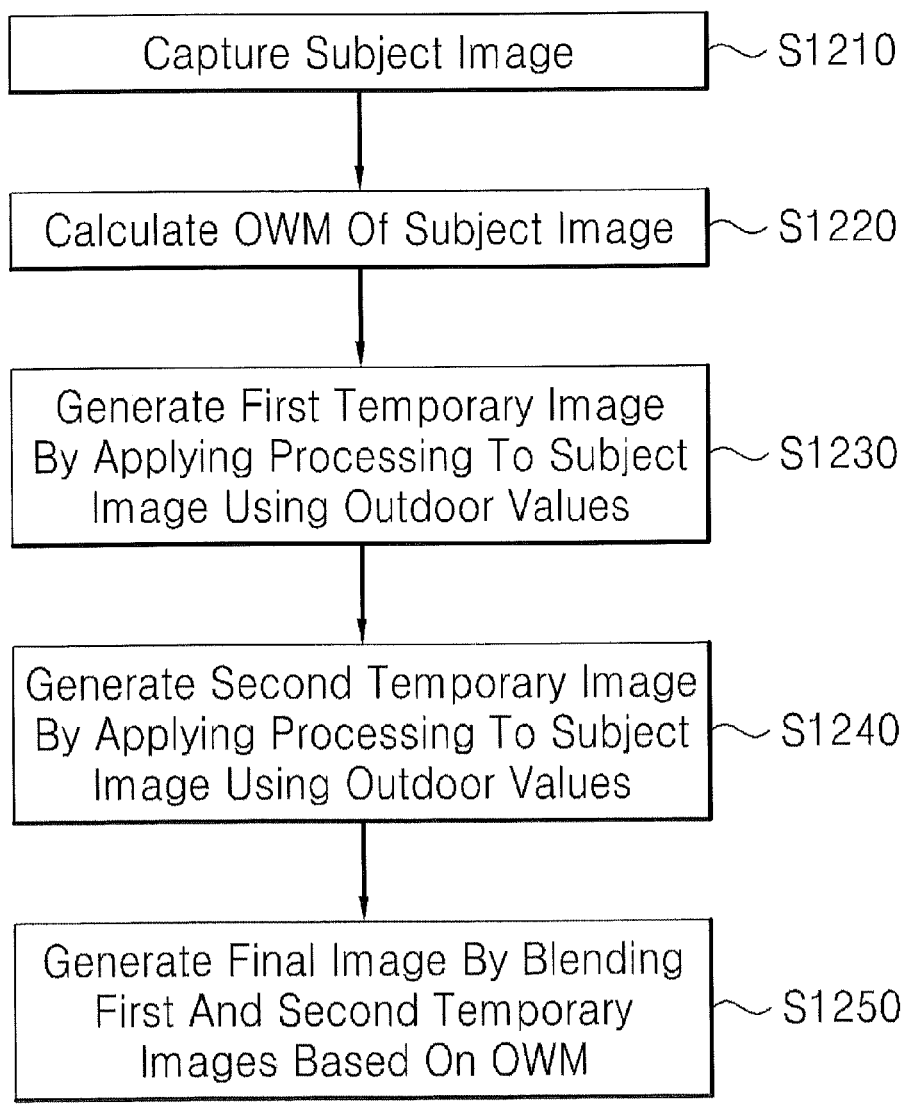
FIG. 12 illustrates a method for performing multiple illumination image processing using an outdoor weight map (OWM).
Figure 15:
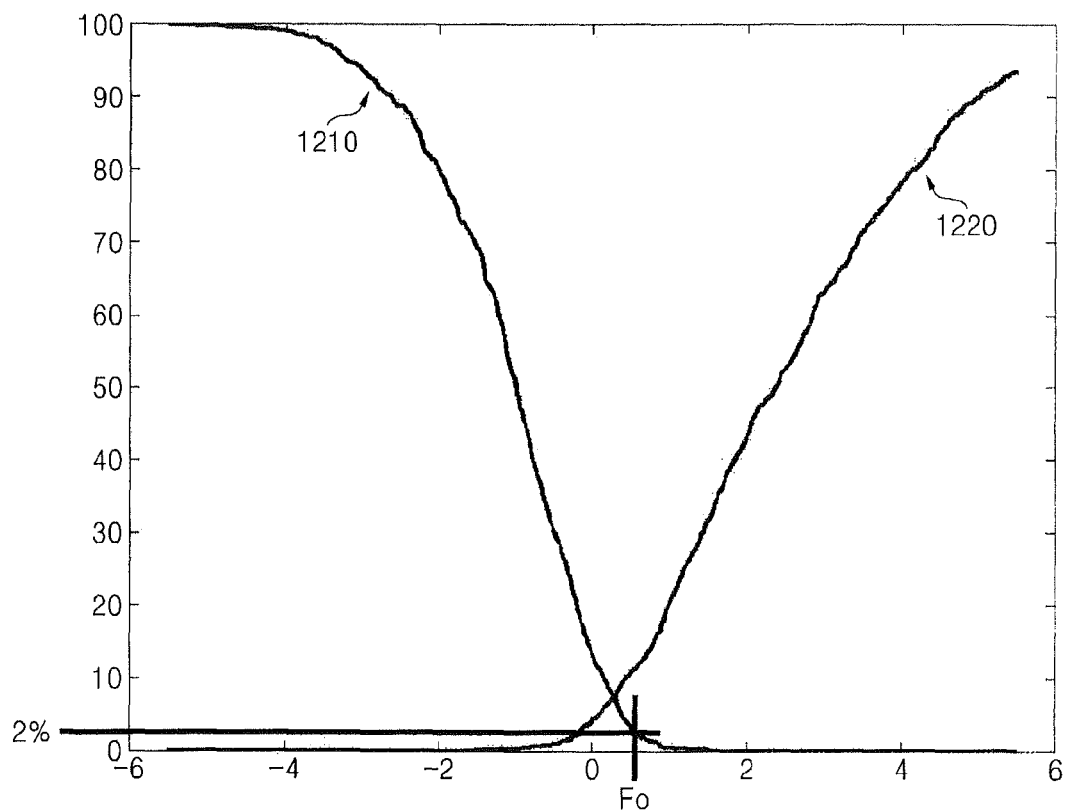
FIG. 15 illustrates a receiver operation curve (ROC) for an IOD according to example embodiments.

The offset of gentle boosting classifier $F_0$ is intended to shift indoor error rate such that the indoor error rate is lower than the outdoor error rate since erroneously classifying image data as indoor image data harms the image more than erroneously classifying the image data as outdoor image data. The offset of gentle boosting classifier $F_0$ value is selected using receiver operator curves of trained gentle boosting classifier. For Example, FIG. 15 illustrates error percentage versus a shift in the gentle boosting classifier offset F for indoor images 1510 and outdoor images 1520. FIG. 12 illustrates an example in which gentle boosting classifier offset $F_0$ being chosen such that the error rate for indoor images is 2%.

The low brightness indoor-outdoor detector ramp $\Delta_F$ is selected from a user's preferences to provide smooth transition between indoor and outdoor scenes.

Next, image signal processing based on the outdoor weight in accordance with example embodiments will be discussed. Performing Multiple Illumination Image Processing based on the OWM Once the outdoor weight values $W_b(x,y)$ are determined, the OWM can be calculated and used to apply image processing, for example AWB, to an image having multiple illumination types. The process for performing image processing on an image having multiple illumination types using the OWM will now be discussed below with reference to FIGS. 12-14.

FIG. 12 illustrates a method for performing multiple illumination image processing using the OWM.

Referring to FIG. 12, in step 1210, the subject image is captured using the imaging sensor 100 illustrated in FIG. 1.

In step S1220 an OWM is calculated for the subject image using, for example, the processor 802. The subject image is calculated by generating patch outdoor weight values $W_b(x, y)$ for a plurality of coordinates within the subject image where (x,y) corresponds to the center coordinate of the associated patch. The coordinates x and y may correspond to any value which can be used for linear measurement including, for example, pixel numbers. Patch outdoor weight values $W_b(x,y)$ may be calculated using equations (20)-(28) discussed above. An example of an image patch for which a patch outdoor weight can be calculated will now be discussed.

Figure 13:
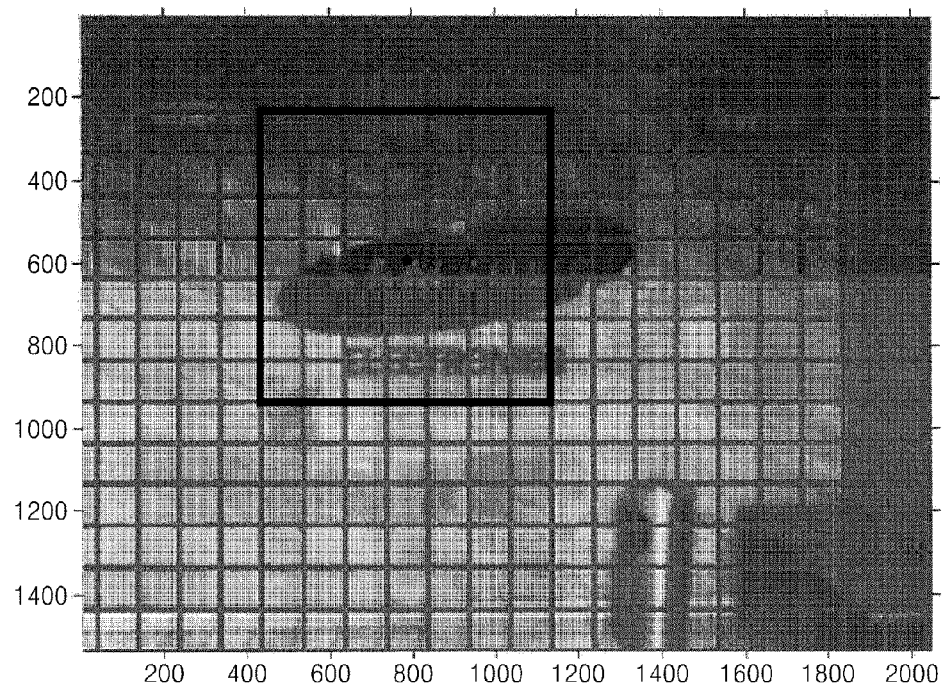
FIG. 13 is illustrates an example of a patch within a subject image.

FIG. 13 is illustrates an example of a patch within a subject image. Referring to FIG. 13, a grid has been applied to the subject image and a superimposed rectangle represents an example of a patch within the subject image for which a patch outdoor weight value $W_b(x,y)$ is calculated. The center coordinate (x,y) for the patch illustrated in FIG. 13 is indicated with a black dot. For example, the OWM of the subject image may include patch outdoor weight values $W_b(x,y)$ for each coordinate (x,y) within the subject image, or a select subset of coordinates (x,y) within the subject image. An example of the OWM will now be discussed.

Figure 14:
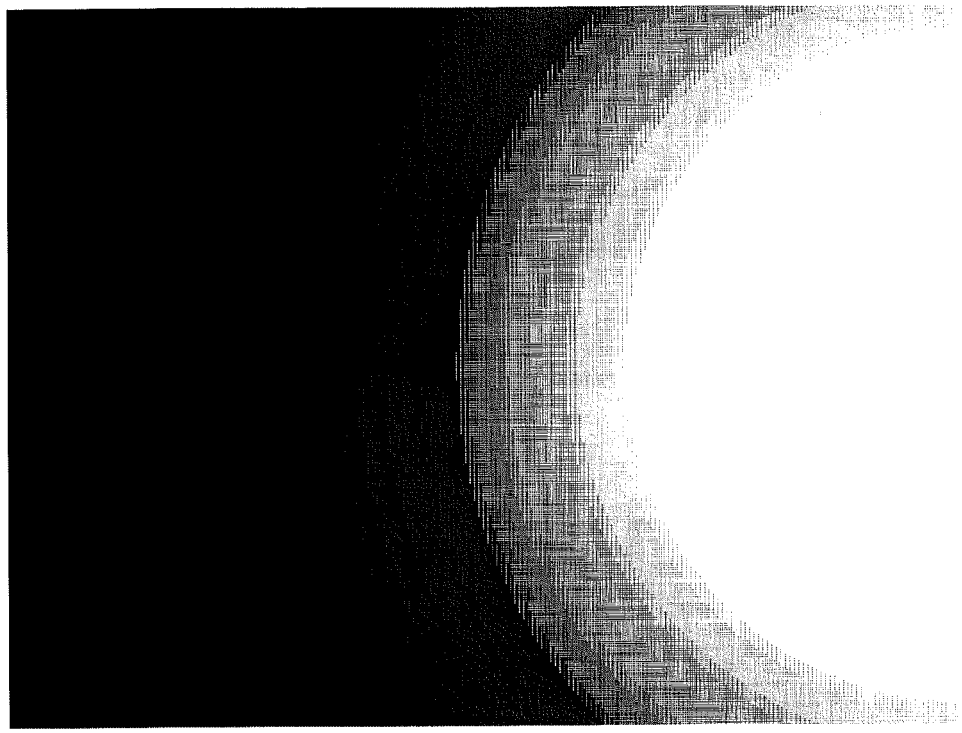
FIG. 14 is an illustration of an OWM.

FIG. 14 is an illustration of an OWM 1400. Referring to FIG. 14, the OWM 1400 is a representation of the patch outdoor weight values $W_b(x,y)$ of an example subject image. The example subject image represented by the OWM 1400 was taken of a scene having multiple illumination types. The left side of the image represented by the OWM 1400 corresponds to a portion of the scene which was lit by indoor lighting, and the right side of the image represented by the OWM 1400 corresponds to a portion of the scene which was lit by an open window, i.e., outdoor lighting. In the OWM 1400, patch outdoor weight values $W_b(x,y)$ are illustrated for each coordinate (x,y) as one of a plurality of shades ranging from black, representing a patch outdoor weight value of 0, and white, representing a patch outdoor weight value of 256.

Returning to FIG. 12, in step S1230, a first temporary image $I_{out}$ is generated by applying image processing to the subject image using outdoor image processing values. For example, while the subject image is being processed to create first temporary image $I_{out}$, the CPU/controller 250 may be used to control the operation of the AWB unit 210 by providing the AWB unit 210 with an IP associated with outdoor images. For example, the AWB unit 110 may use an IP calculated based on outdoor zone 5 of the gray zone gamut illustrated in FIG. 5. Further, in step S1230, the CPU/controller 250 may be used to control the operation of the CCM unit 220, the gamma correction unit 230, and the chromatic aberrations unit 240 to perform an image processing procedure on the subject image corresponding with outdoor images in accordance with well know procedures for performing image processing on outdoor images. The first temporary image $I_{out}$ may be stored in, for example, a buffer (not pictured) included in the imaging system 100.

In step S1240, a second temporary image $I_{in}$ is generated by applying image processing to the subject image using outdoor image processing values. For example, while the subject image is being processed to create second temporary image $I_{in}$, the CPU/controller 250 may be used to control the operation of the AWB unit 210 by providing the AWB unit 210 with an IP associated with indoor images. For example, the AWB unit 110 may use an IP calculated based on indoor zone 1 of the gray zone gamut illustrated in FIG. 5. Further, the CPU/controller 250 may be used to control the operation of the chromatic aberrations unit CAC 240, CCM unit 220, and the gamma correction unit 230, to perform image processing procedures on the subject image corresponding with indoor images in accordance with well know procedures for performing image processing on indoor images. The second temporary image $I_{in}$ may be stored in, for example, a buffer (not pictured) included in the imaging system 100.

Applicants note though steps S1230 and S1240 including generating the first and second temporary images, $I_{out}$ and $I_{in}$, are illustrated as being performed serially, according to example embodiments, S1240 may also be performed, for example, before step S1230 or in parallel with step S1230. Further, though step S1220 including generating the OWM is illustrated as occurring before steps S1230 and S1240. According to example embodiments, step S1220 may also occur after one or both of steps S1230 and S1240, or in parallel with one or both of steps S1230 and 1240.

In step S1250, a final resulting image is generated by performing a blending operation on first and second temporary images $I_{out}$ and $I_{in}$ using the OWM calculated in step S1220. For example, a final image $I_{res}$ may be generated according equation (29) below.

$$I_{res}(x, y) = \frac{OWM(x, y)I_{out}(x, y) + (256 - OMW(x, y))I_{in}(x, y)}{256} \quad (29)$$

Accordingly, in step S1250, the final resulting image $I_{res}$ is created in which the value at each coordinate (x,y) is represented by a combination of corresponding values for each coordinate (x,y) in the first temporary image, $I_{out}$, which represents the subject image processed based on outdoor processing values, and the second temporary image, $I_{in}$, which represents the subject image processed based on indoor processing values. Thus, for each coordinate (x,y) of the final resulting image $I_{res}$, the OWM calculated in step S1220 is used to control the balance between the first temporary image, $I_{out}$, and the second temporary image, $I_{in}$.

According to example embodiments, an OWM, a representation of the degree to which a portion of the scene represents an outdoor image, may be calculated based on outdoor weight values for each of a plurality of coordinates within a subject image. Two temporary images formed based on processing the image according to outdoor image processing parameters and indoor image processing parameters, respectively, may be blended based on the OWM to form a final resulting image. Accordingly, in the final resulting image, portions of the subject image corresponding to outdoor lighting will be more heavily represented by the first temporary image $I_{out}$, and portions of the subject image corresponding to indoor lighting will be more heavily represented by the first temporary image $I_{in}$. Consequently, issues commonly associated with performing image processing on images of scenes having multiple illumination types may be reduced, and the image quality of the final image may be increased.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed:

1. A multiple source automatic white balancing method, the method comprising:
    performing a first image processing on a subject image and generating a first processed image;
    performing a second image processing on the subject image and generating a second processed image; and
    generating a third processed image by blending the first and second processed images together based on an output of an outdoor weight map function, wherein
        the first image processing is performed using parameters associated with indoor lighting, and the second image processing is performed using parameters associated with outdoor lighting,
        generating the third processed image includes determining the output of the outdoor weight map function for each of a plurality of sections of the subject image, and
        forming each of a plurality of a sections of the third image by blending a corresponding section of the first processed image with a corresponding section of the second image based on the output of outdoor weight map function associated with a corresponding section of the subject image, and
        determining the output of the outdoor weight map function for each of a plurality of sections of the subject image includes
        determining a brightness value for each of the plurality of sections;
        comparing the brightness value to upper and lower brightness thresholds for each of the plurality of sections;
        selecting one of a high brightness outdoor weight function, a low brightness outdoor weight function, and a combination of the high and low brightness outdoor weight functions based on the comparison; and
        generating the output based on the selected function.

2. The method of claim 1, further comprising:
    constructing a classifier by training the classifier based on image statistics determined for each of a plurality of training images,
    wherein the low brightness outdoor weight function is based on the classifier.

3. The method of claim 2, wherein the determined image statistics include whether each training image is an indoor image or an outdoor image, a normalized balance of each training image, a first illumination point of each training image, and a second illumination point of each training image.

4. The method of claim 3, wherein the determined image statistics further include, for each of the plurality of training images, a first gray point of the training image, a second gray point of the training image, a gamut height of the training image, and a gamut width of the training image.

5. The method of claim 2, further comprising:
    determining an output of the classifier for each of the plurality of sections of the subject image, wherein, for each section of the subject image, an output of the low brightness outdoor weight function for the section is determined based on the corresponding output of the classifier for the section.

6. The method of claim 1, wherein for each of the plurality of sections of the third image, the section is defined by $$I_{res}(x, y) = \frac{OWM(x, y)I_{out}(x, y) + (256 - OMW(x, y))I_{in}(x, y)}{256},$$

$I_{res}(x,y)$ being the section of the third image, $I_{in}(x,y)$, being a section of the first image corresponding to the section of the third image, $I_{out}(x,y)$ being a section of the second image corresponding to the section of the third image, and OWM (x,y) being an output of the outdoor weight map function corresponding to the section of the third image.

7. An image processing apparatus comprising:
an image sensor configured to capture image data representing a subject image by converting optical images into electrical signals; and
an image processor coupled to the image sensor, the image processor being configured to receive the captured image data and to perform an automatic white balancing operation on the subject image by
performing a first image processing on the subject image and generating a first processed image;
performing a second image processing on the subject image and generating a second processed image; and
generating a third processed image by blending the first and second processed images together based on an output of an outdoor weight map function, wherein
the image processor is configured to perform the first image processing by using parameters associated with indoor lighting, and the second image processing is performed using parameters associated with outdoor lighting,
the image processor is configured to generate the third processed image by determining the output of the outdoor weight map function for each of a plurality of sections of the subject image, and forming each of a plurality of sections of the third image by blending a corresponding section of the first processed image with a corresponding section of the second image based on the output of outdoor weight map function associated with a corresponding section of the subject image, and
the image processor is configured to determine the output of the outdoor weight map function for each of the plurality of sections of the subject image by
determining a brightness value for each of the plurality of sections
comparing the brightness value to upper and lower brightness thresholds for each of the plurality of sections;
selecting one of a high brightness outdoor weight function, a low brightness outdoor weight function, and a combination of the high and low brightness outdoor weight functions based on the comparison; and
generating the output based on the selected function.

8. The apparatus of claim 7, wherein the image processor is further configured such that the low brightness outdoor weight function is based on a classifier, the classifier being constructed by training the classifier based on image statistics determined for each of a plurality of training images.

9. The apparatus of claim 8, wherein the determined image statistics include whether each training image is an indoor image or an outdoor image, a normalized balance of each training image, a first illumination point of each training image, and a second illumination point of each training image.

10. The apparatus of claim 9, wherein the determined image statistics further include, for each of the plurality of training images, a first gray point of the training image, a second gray point of the training image, a gamut height of the training image, and a gamut width of the training image.

11. The apparatus of claim 7, wherein the image processor is further configured to
determine an output of the classifier for each of the plurality of sections of the subject image, wherein, for each section of the subject image, an output of the low brightness outdoor weight function for the section is determined based on the corresponding output of the classifier for the section.

12. The apparatus of claim 7, wherein the image processor is configured such that, for each of the plurality of sections of the third image, the section is defined by $$I_{res}(x, y) = \frac{OWM(x, y)I_{out}(x, y) + (256 - OMW(x, y))I_{in}(x, y)}{256},$$

$I_{res}(x,y)$ being the section of the third image, $I_{in}(x,y)$, being a section of the first image corresponding to the section of the third image, $I_{out}(x,y)$ being a section of the second image corresponding to the section of the third image, and OWM (x,y) being an output of the outdoor weight map function corresponding to the section of the third image.

* * * * *